(12) United States Patent
Weedon et al.

(10) Patent No.: US 6,951,685 B1
(45) Date of Patent: Oct. 4, 2005

(54) ULTRA HIGH MOLECULAR WEIGHT POLYETHYLENE FIBERS

(75) Inventors: Gene C. Weedon, Richmond, VA (US); Charles Paul Weber, Jr., Monroe, NC (US); Kenneth C. Harding, Midlothian, VA (US)

(73) Assignee: Integrated Textile Systems, Inc., Monroe, NC (US)

( * ) Notice: Subject to any disclaimer, the term of this patent is extended or adjusted under 35 U.S.C. 154(b) by 14 days.

(21) Appl. No.: 10/926,681

(22) Filed: Aug. 25, 2004

Related U.S. Application Data

(62) Division of application No. 09/999,083, filed on Nov. 27, 2001.

(51) Int. Cl.$^7$ ................................................. D01F 6/00
(52) U.S. Cl. ..................................... 428/364; 428/394
(58) Field of Search .................................. 428/364, 394

(56) References Cited

U.S. PATENT DOCUMENTS

| | | | | |
|---|---|---|---|---|
| 4,790,850 A | * | 12/1988 | Dunn et al. ............... | 623/13.19 |
| 5,093,197 A | * | 3/1992 | Howard et al. ............. | 428/372 |
| 5,578,373 A | * | 11/1996 | Kobayashi et al. ......... | 428/364 |

* cited by examiner

Primary Examiner—N. Edwards

(57) ABSTRACT

A method for the production of films/fibers of UHMWPE below 3 mils and preferably about 2 mils in thickness. The process involves calendering and/or drawing the materials of the prior art under careful tension control at a temperature above the melting point of the UHMWPE material. Before and after subsequent slitting, and/or fibrillation, UV resistance treatments, etc the thin films/fibers thus produced find use in such diverse applications as personal armor, dental floss, and sails for sail boats.

14 Claims, 3 Drawing Sheets

ULTRA HIGH MOLECULAR WEIGHT POLYETHYLENE FIBERS

This application is a Division of U.S. patent application Ser. No. 09/999,083 filed Nov. 27, 2001 and copending herewith.

FIELD OF THE INVENTION

The present invention relates to thin tapes of ultra high molecular weight polyethylene fibers and tapes and to methods for their production.

BACKGROUND OF THE INVENTION

The processing of ultra high molecular weight polyethylene (UHMWPE), i.e. polyethylene having a molecular weight in excess of 5 million, is known in the polymer arts to be extremely difficult. Products made from such materials are, however, very strong, tough and durable.

In the following series of U.S. Patents filed by Kobayashi et al and assigned to Nippon Oil Co., Ltd. a number of inventions related to the fabrication of fibers and films of polyolefins generally and UHMWPE specifically, are described: U.S. Pat. Nos. 4,996,011, 5,002,714, 5,091,133, 5,106,555, 5,200,129, and 5,578,373. The processes described in these patents are depicted schematically in FIG. 1 and generally describe the continuous production of high strength and high modulus polyolefin films by feeding polyolefin powder between a combination of endless belts disposed in an up and down opposing relationship, compression molding the polyolefin powder at a temperature below its melting point between the endless belts and then rolling and stretching the resultant compression molded polyolefin into an oriented film. Some of these patents also discuss the fibrillation of the resultant films and slitting of the films to form "fibers". As compression molded, the sheet is relatively friable thus requiring the subsequent stretching or drawing operations to provide an oriented film that exhibits very good strength and durability properties. In fact, the strength of such materials produced by these processes is 3 times that of steel on a weight basis and they exhibit very low creep. The UHMWPE films produced by the processes described in these patents have a final thickness of between 0.003" and 0.012".

While the thus produced materials quite obviously exhibit highly desirable properties, including useful ballistic properties, one of their major shortcomings is their relative stiffness that makes them difficult to "weave" and otherwise process into useful products. When woven, the resulting fabrics also tend to be very stiff and uncomfortable. This stiffness is largely a result of the fact that the fibers or tapes produced as just described are relatively "thick", i.e. on the order of more than about 3 mils. In order to obtain a material that can be easily woven to provide comfortable clothing and the like, and find use in such other applications as dental floss (another "high strength/thin material application) and high strength "thread" or fiber, it is necessary that the "thickness" of the UHMWPE film be reduced to below 3 mils and preferably below about 2 mils. Subsequent slitting and other treatments, for example fibrillation, can further contribute to the production of such products. Because of the high strength of these materials, it has been thought until now that the best approach to achieve such "thickness reduction" was to slit the film of the prior art into narrow strips (on the order of about 10 mils) and to stretch such narrow strips. This has proven largely unsuccessful since the material in such narrow widths will either refuse to stretch or break when elongated under conventional drawing and/or calendering processes. In fact, until the application of the methods described herein, to the best of our knowledge, no attempt to achieve draw ratios greater than 100, as would be necessary to meet the above-described requirements, has been successful.

It therefore would be most desirable to define a process whereby these high strength materials could be fabricated into films or tapes and "fibers" that are less than 3 mils and preferably below about 2 mils in thickness. The provision of such a process would open up entirely new applications for these materials in such diverse fields as ballistic protective clothing and dental floss.

OBJECTS OF THE INVENTION

It is therefor an object of the present invention to provide a method for the production of UHMWPE films having a thickness below 3 mils and preferably below about 2 mils.

It is another object of the present invention to provide fibers of such materials that are relatively easy to weave and when woven, result in a "soft" and comfortable garment.

It is yet another object of the present invention to provide fibers of such materials that are suitable for such applications as dental floss wherein very high strength and the like properties are desired.

SUMMARY OF THE INVENTION

According to the present invention, there is provided a method for the production of films/fibers of UHMWPE below 3 mils and preferably below about 2 mils in thickness. This process involves calendering and/or drawing the tapes or fibers of the prior art under careful tension control at a temperature above the melting point of the UHMWPE material. Before or after subsequent slitting, fibrillation, UV resistance treatment, etc the thin films/fibers thus produced find use in such diverse applications as personal armor, dental floss, and sails for sail boats.

DETAILED DESCRIPTION

The method of the present invention provides a process for the production of films/fibers of UHMWPE below 3 mils and preferably below about 2 mils in thickness. This process involves calendering and/or drawing the tapes of the prior art under careful tension control at a temperature above the melting point of the UHMWPE material. Before or after subsequent slitting, fibrillation, UV resistance treatment, etc the thin films/fibers thus produced find use in such diverse applications as personal armor, dental floss, and sails for sail boats. The process of the present invention can be carried out by either drawing or calendering (or both alternatively) "tapes" or fibers of the 3+mil product or intermediate product of the prior art. Such processes will now be described in detail. The term "tape" as used herein refers to input material widths on the order of greater than about ½ inch and preferably greater than 1 inch and is specifically used to distinguish from the "fiber" product materials of the prior art that were on the order of ⅛ of an inch wide.

Figure 1:
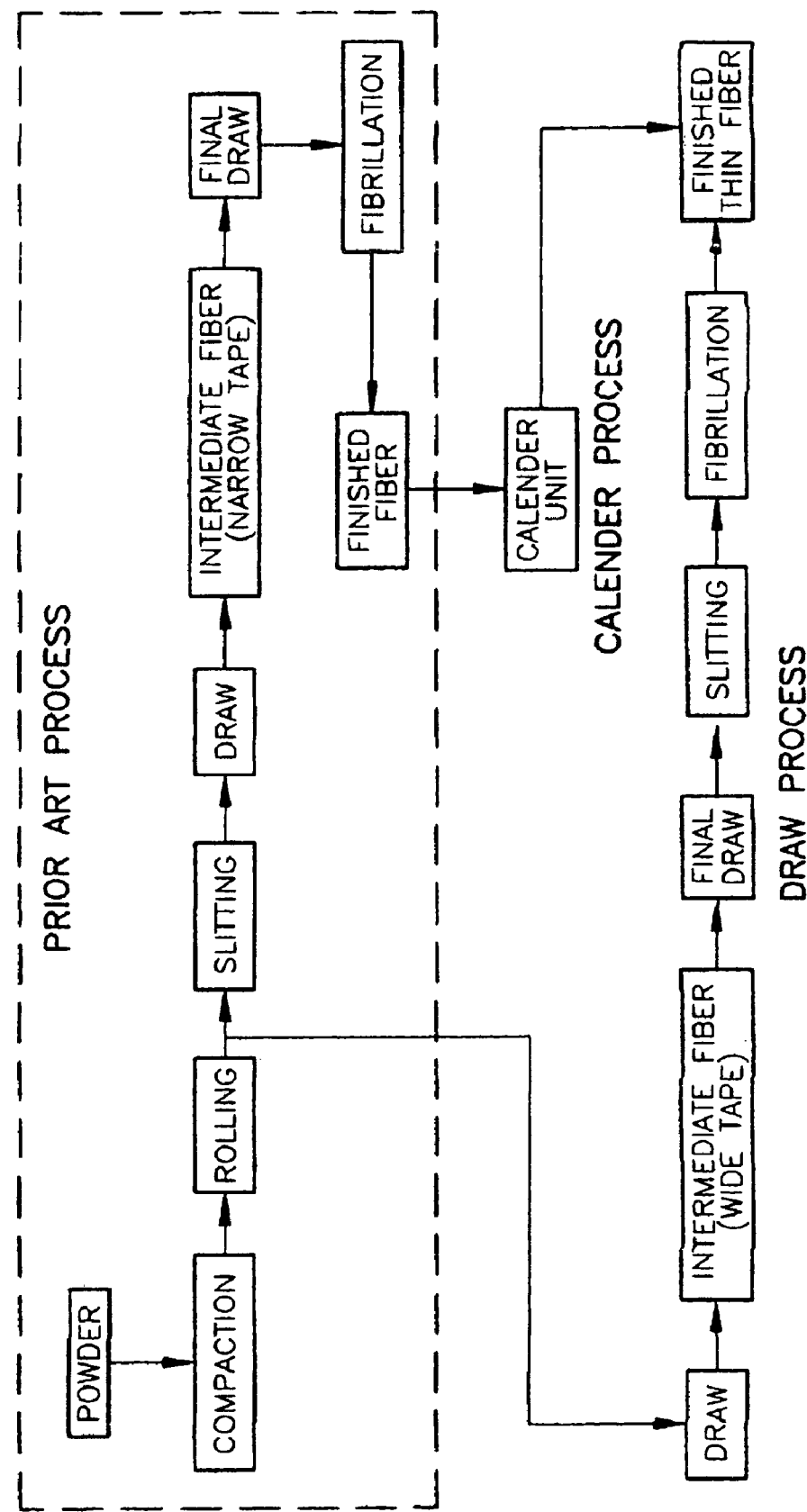
FIG. 1 is a schematic representation of the production process of the prior art and the thin fiber/film production processes of the present invention.

Referring now to FIG. 1, the production process of the prior art as described in the above-referenced patents, comprises compacting a powder of the selected polyolefin material, in our case UHMWPE, rolling, slitting to a width that can be drawn using conventional techniques, to produce a narrow tape, drawing again using conventional techniques and fibrillating to produce the final fiber that exhibits a thickness of 3 mils or more.

Figure 2:
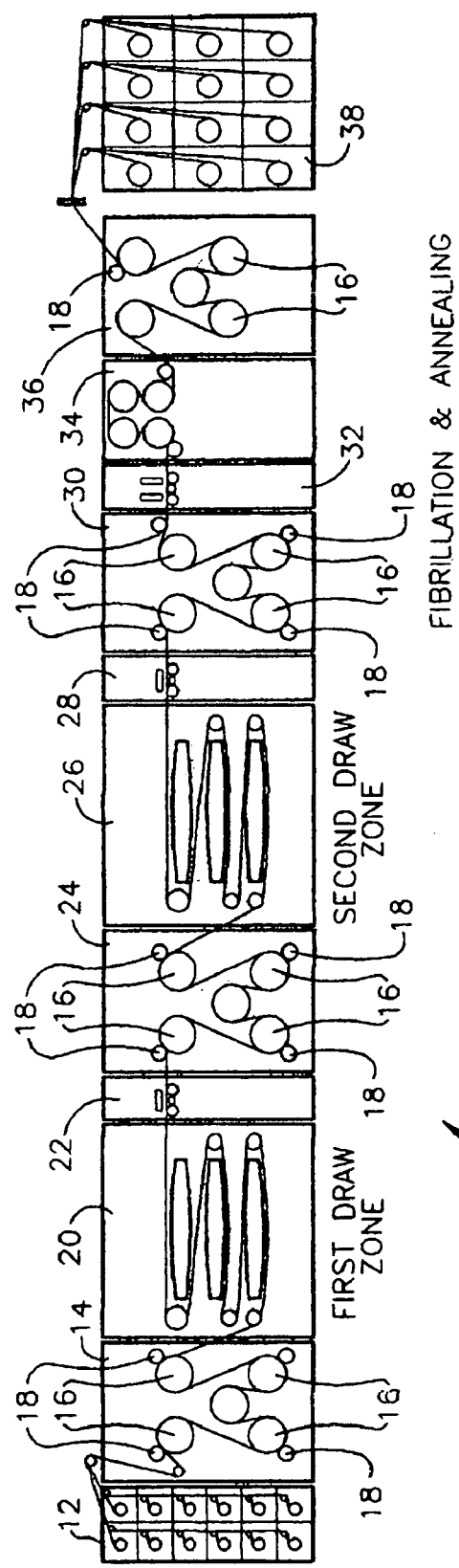
FIG. 2 is a schematic diagram of the drawing unit used to implement the process of the present invention.

Referring now to FIG. 2, the drawing apparatus utilized to achieve the thickness reductions that result in production of the preferred thin UHMWPE products of the present invention 10 comprises:

a payoff 12, a godet stand 14 including godet rolls 16 and nip rolls 18 for establishing and maintaining tension in the line, a first draw zone 20, a first in-line tension sensor 22, a second godet stand 24, a second draw stand 26, a second in-line tension sensor 28, a third godet stand 30 and according to the preferred embodiment, a fibrillation unit 32, a nip roll stand 34 for maintaining tension and godet annealing station 36 comprised of unheated rolls 38 to anneal the product prior to take up in take up stand 38. As seen from FIG. 1, the input or starting material of this process is the thick, compressed and rolled but unoriented product of the rolling step of the prior art production process that exhibits a thickness on the order of 10 mils or more.

Each of the elements of the apparatus just described are well known in the film and fiber drawing arts as is their combination in a line of the type just described. Consequently, no detailed description of such a line is required or will be made herein and the reader is referred to the numerous design manuals and descriptions of such apparatus commonly available in the art.

Similarly, the calendering apparatus depicted in FIG. 2 requires no description beyond that presented immediately below as each of its elements and the combination thereof are well known in the fiber and film calendering arts and easily constructed in accordance with that general knowledge.

Referring now to FIG. 2, the calendering apparatus 40 useful in the production of the UHMWPE materials described herein comprises:

an unwind or payoff station 42, a tension control device 44, a preheat section 46, a pair of heated calender rolls 48, a second tension control section 50 and a rewind or take-up station 52. Preheat section 46 heats the input material to the temperatures described below prior to entry of the input material into calender roll pair 48. Calender rolls 48 are heated to impart the operating temperatures indicated below to the preheated input material and rotate the direction of arrows 54 shown in FIG. 3. The thickness of the UHMWPE product produced by calendering in the equipment depicted in FIG. 3 will, of course be dictated by the gap at nip 56 between calender rolls 48. Such gap can be controlled by either setting a fixed gap to produce product of the desired thickness or by applying a controlled pressure in nip 56.

While the calendering equipment just described is similarly generally old and well known in the prior art, the operation of same in the production of the UHMWPE films and fibers of the present invention is new and forms the core of the present invention.

Figure 3:
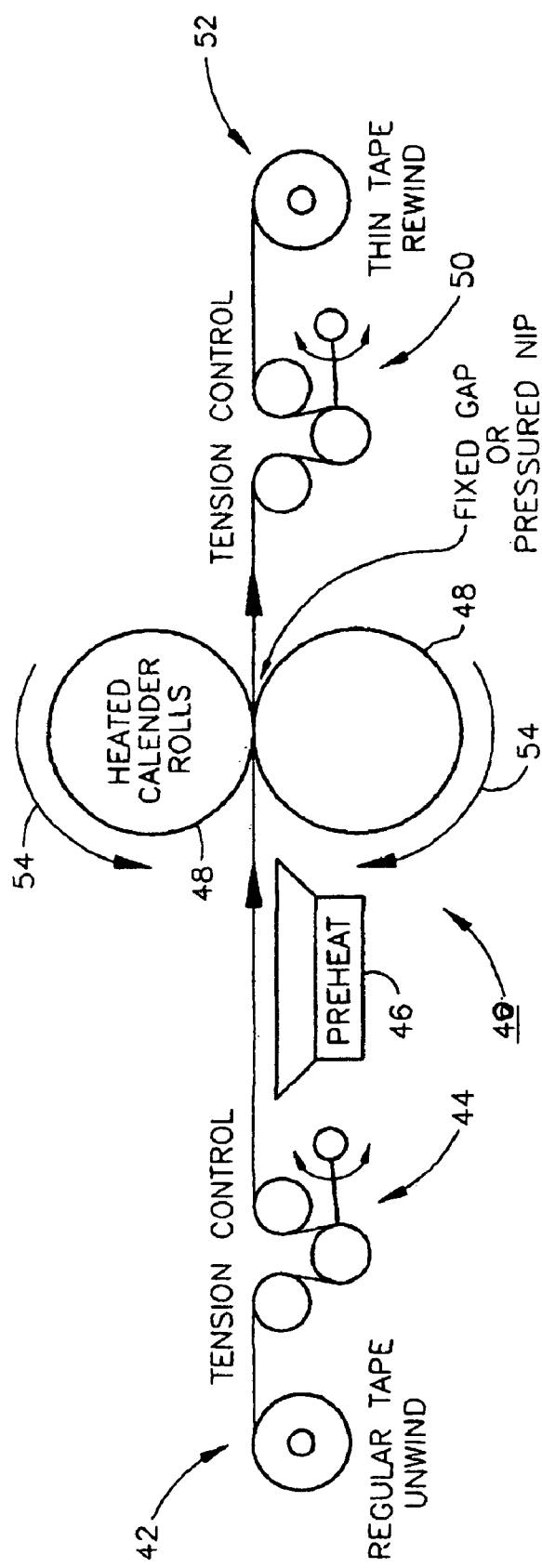
FIG. 3 is a schematic diagram of the calendering unit used to implement the process of the present invention.

Thus according to the present invention, input material comprising an UHMWPE "tape" or "fiber" as produced in the prior art production processes referred to hereinabove and having a thickness of about 3 mils or more is introduced into a drawing or calendering apparatus of the type just described and depicted in FIGS. 2 and 3. In the case of the drawing operation or approach, the input material is a "tape" having a width greater than about ⅛" and preferably in the range of 2.5 to about 3.0 inches, while in the calendering approach the input material is a "fiber" having a width below about ⅛". In either process, the input material is first preheated to a temperature at or above its melting point, about 141° C., and drawing or calendering is accomplished by the application of 1) controlled tension in the case of the drawing operation or 2) pressure with controlled tension in the case of the calendering operation at a temperature of between about 145° C. and about 170° C. Preferably drawing and calendering are performed at a temperature of between about 150° C. and about 163° C. and most preferably between about 152° C. and about 159° C. At temperature levels below these ranges, no significant thickness reduction will occur, while at temperatures above these ranges the material will tend to separate in the drawing and calendering operations.

Maintaining a tension of between about 0.1 and about 0.05 g/denier, the latter unit being defined as the weight in grams of 9000 meters of the product film or fiber, during drawing and calendering, is also highly important to the successful production of a suitable product having the required "thinness" specified herein. At tension levels below 0.1 g/denier no significant drawing or reduction will be obtained while at tension levels above about 0.5 g/denier the material will tend to separate.

After thickness reduction by calendering and/or drawing in the apparatus shown in FIGS. 2 and 3 and according to the processing parameters just described, various additional operations can be performed to make the product suitable for the various applications described below, For example, as shown in FIG. 2, the drawing line 10 may include a fibrillation roll or other apparatus for purposes of introducing short slits across the width of the product film or fiber. Fibrillation and the equipment used to produce it are both well known in the art and, in fact, were used in the prior art production processes. The purpose and value of this treatment is described below. The "tape" or fiber output of the drawing and calendering processes can be slit to an appropriate width for the production of fibers and then subsequently fibrillated. As described below, for certain applications such as dental floss, special slitting treatments may be necessary to obtain an acceptable final product.

As will be apparent to the skilled artisan, combinations of the calendering and drawing processes described herein can easily be envisioned, and such combinations are intended to be within the scope of the appended claims.

With regard to fibrillation, the application of this process to the product fiber or film through the use of, for example, a fibrillating roll, i.e. a rotating steel roll incorporating slitting teeth about its periphery, yields a film or fiber that is much more flexible, pliant or softer. Consequently, such a product can be more easily woven and is much more comfortable to the wearer of a garment such as a ballistic vest produced therefrom. Additionally, the availability of such a "soft" material woven from the thinner and more flexible fibers of the UHMWPE material described herein allows the production of, for example, ballistic vests comprised of multiple layers of fabric thus providing enhanced ballistic protection to the wearer.

Fibrillation is also highly desirable in the production of dental floss. The thin and "soft" yet very strong UHMWPE fibers produced in accordance with the present invention are excellent candidates for this application since they are also "slick" and thus easily moved between the teeth. However, the producers of dental floss often wish to incorporate therein or thereon a variety of so-called "hedonics and efficacy" enhancing additives such as polishes, flavorings, breath fresheners etc. The inherent "slickness" of UHMWPE materials that makes them excellent candidates for dental floss applications makes them resistant to the incorporation of such additives. The provision of fibrillation in the fiber provides voids, gaps and interstices into which such additives can be incorporated in a fashion the allows them to leach or otherwise emerge from the fiber structure in situ as the floss is utilized in the human mouth. The level of fibrillation is, of course, largely a matter of design and will be dictated, in the case of dental floss, by the particular additives to be incorporated into the dental floss.

In addition to the fibrillation that is highly desirable in the production of dental floss from the UHMWPE fibers of the present invention, it is important that care be exercised in the slitting of the "tapes" for the production of such a product. The use of conventional slitting knives as are used in the art in the production of, for example blown films, and as were used in the slitting portion of the prior art process, while suitable for the production of fibers in accordance with the present invention have a major shortcoming in that they apparently leave a serrated surface at the point of slitting. This serration can result in gum damage if the fiber is then used as dental floss. Accordingly, it has been discovered that the use of heated slitting knives, heated to a temperature of above the melting point of the UHMWPE, i.e. above about 141° C. must be used to provide an even or smooth surface suitable for use in dental floss.

There has thus been described a novel method for the production of a novel class of UHMWPE films and fibers that are thinner than any previously produced. The provision of such novel films and fibers opens up entirely new applications for these materials in the fields of, for example dental floss and protective garments.

As the invention has been described, it will be apparent to those skilled in the art that the same may be varied in many ways without departing from the spirit and scope of the invention. Any and all such modifications are intended to be included within the scope of the appended claims.

What is claimed is:

1. An ultrahigh molecular weight polyethylene slit film fiber produced by a method comprising drawing, calendering or drawing and calendering an input material of ultra high molecular weight polyethylene having a thickness equal to or greater than 3 mils at a temperature above its melting point under carefully controlled tension and slitting the material with knives, heated to a temperature above the melting point of the ultrahigh molecular weight polyethylene to provide an even or smooth cut surface on the slit film fiber.

2. The ultra high molecular weight polyethylene slit film fiber of claim 1 wherein said ultrahigh molecular weight polyethylene slit film fiber has a thickness below about 3 mils.

3. The ultra high molecular weight polyethylene slit film fiber of claim 2 wherein calendering is performed at a temperature of between about 145° C. and about 170° C.

4. The ultra high molecular weight polyethylene slit film fiber of claim 2 wherein calendering is performed at a temperature of between about 150° C. and about 163° C.

5. The ultra high molecular weight polyethylene slit film fiber of claim 3 wherein calendering is performed at a temperature of between about 152° C. and about 159° C.

6. The ultra high molecular weight polyethylene slit film fiber of claim 1 wherein said carefully controlled tension is between about 0.1 and about 6 g/denier.

7. The ultra high molecular weight polyethylene slit film fiber of claim 3 wherein said carefully controlled tension is between about 0.1 and about 2 g/denier.

8. The ultra high molecular weight polyethylene slit film fiber of claim 1 wherein drawing is performed at a temperature of between about 150° C. and about 170° C.

9. The ultra high molecular weight polyethylene slit film fiber of claim 8 wherein drawing is performed at a temperature of between about 150° C. and about 163° C.

10. The ultra high molecular weight polyethylene slit film fiber of claim 9 wherein drawing is performed at a temperature of between about 152° C. and about 159° C.

11. The ultra high molecular weight polyethylene slit film fiber of claim 8 wherein said carefully controlled tension is between about 2.0 and about 6.0 g/denier.

12. The ultra high molecular weight slit film fiber of claim 1 that has been fibrillated after drawing, calendering or drawing and calendering.

13. An ultra high molecular weight polyethylene slit film fiber having a generally rectangular cross-section and smooth cut edges.

14. The ultra high molecular weight polyethylene slit film fiber of claim 13 wherein said ultrahigh molecular weight polyethylene slit film fiber has a thickness below about 3 mils.

* * * * *